(12) United States Patent
Lee

(10) Patent No.: US 11,218,629 B2
(45) Date of Patent: Jan. 4, 2022

(54) TRACKING SYSTEM AND METHOD THEREOF

(71) Applicant: PEGATRON CORPORATION, Taipei (TW)

(72) Inventor: Yi-Huan Lee, Taipei (TW)

(73) Assignee: PEGATRON CORPORATION, Taipei (TW)

(*) Notice: Subject to any disclaimer, the term of this patent is extended or adjusted under 35 U.S.C. 154(b) by 12 days.

(21) Appl. No.: 16/790,813

(22) Filed: Feb. 14, 2020

(65) Prior Publication Data

US 2020/0275017 A1 Aug. 27, 2020

(30) Foreign Application Priority Data

Feb. 23, 2019 (TW) .................................. 108106190

(51) Int. Cl.
*G06T 7/00* (2017.01)
*H04N 5/232* (2006.01)
*G06T 7/579* (2017.01)
*G06K 9/00* (2006.01)

(52) U.S. Cl.
CPC ..... *H04N 5/23219* (2013.01); *G06K 9/00255* (2013.01); *G06K 9/00288* (2013.01); *G06T 7/579* (2017.01)

(58) Field of Classification Search
None
See application file for complete search history.

(56) References Cited

U.S. PATENT DOCUMENTS

| 7,848,548 | B1 | 12/2010 | Moon et al. |
| 8,390,736 | B2 | 3/2013 | Yang et al. |
| 2005/0013488 | A1* | 1/2005 | Hashimoto ........ G06K 9/00369 382/216 |
| 2005/0035862 | A1* | 2/2005 | Wildman ......... G08B 13/19697 340/573.1 |

(Continued)

FOREIGN PATENT DOCUMENTS

| TW | 485321 | 5/2002 |
| TW | 201101199 A | 1/2011 |

(Continued)

OTHER PUBLICATIONS

Face Recognition at a Distance System for Surveillance Applications. Wheeler et al. (Year: 2010).*

*Primary Examiner* — Delomia L Gilliard
(74) *Attorney, Agent, or Firm* — McClure, Qualey & Rodack, LLP

(57) ABSTRACT

A tracking system includes an image capture device, a memory and a processor. The image capture device is used to capture a video stream in a target area. The memory stores face information. The processor reads the face information from the memory and reads the video stream from the image capture device. The processor is used to identify a face matching the face information in the video stream to track the movement of the face in the target area. The processor is used to determine whether a distance between the face and the image capture device is greater than a predetermined distance. The processor is used to track the movement of a human figure corresponding to the face in the target area when the processor determines that the distance is greater than the predetermined distance.

18 Claims, 4 Drawing Sheets

(56) References Cited

U.S. PATENT DOCUMENTS

| | | | |
|---|---|---|---|
| 2007/0127778 A1* | 6/2007 | Fujimoto | G06T 7/246 |
| | | | 382/104 |
| 2012/0075464 A1* | 3/2012 | Derenne | H04N 7/185 |
| | | | 348/135 |
| 2013/0195316 A1* | 8/2013 | Bataller | G06K 9/6255 |
| | | | 382/103 |
| 2014/0169627 A1* | 6/2014 | Gupta | G06T 5/006 |
| | | | 382/103 |
| 2015/0109442 A1* | 4/2015 | Derenne | G06F 19/00 |
| | | | 348/143 |
| 2019/0042839 A1* | 2/2019 | Tomi | G06K 9/00288 |
| 2019/0075237 A1* | 3/2019 | Cheung | G06K 9/00369 |
| 2020/0125838 A1* | 4/2020 | Dalley, Jr | G08B 13/19602 |
| 2020/0186719 A1* | 6/2020 | Lee | H04N 5/23299 |
| 2020/0342211 A1* | 10/2020 | Wang | G06T 7/223 |

FOREIGN PATENT DOCUMENTS

| | | |
|---|---|---|
| TW | 201525877 A | 7/2015 |
| WO | 2018133666 A1 | 7/2018 |
| WO | WO-2020107524 A1 * | 6/2020 |

\* cited by examiner

TRACKING SYSTEM AND METHOD THEREOF

RELATED APPLICATIONS

This application claims priority to Taiwan Application Serial Number 108106190, filed Feb. 23, 2019, which is herein incorporated by reference.

BACKGROUND

Technical Field

The present disclosure relates to a tracking system and a tracking method, and particularly relates to a person tracking system based on image recognition and a person tracking method thereof.

Related Art

A system in the prior art usually implements person tracking by respectively adopting a face recognition program and a face tracking program. In the face recognition program of the prior art, the recognition rate for farther faces is greatly reduced. In the face tracking program of the prior art, interlaced faces in pictures, faces in background and faces leaving from the pictures and then returning to the pictures are easy to misjudge, so that the tracking accuracy rate is greatly reduced.

Furthermore, if the face tracking system executes the two programs in parallel, the amount of calculation of the face tracking system is multiplied, making practical implementation difficult.

SUMMARY

In order to solve the above problems, the present disclosure provides the following embodiments to enable a face recognition program and a face tracking program to synergistically operate favorably.

An embodiment of the present disclosure relates to a tracking system. The tracking system at least includes an image capture device, a memory and a processor, and the processor is coupled to the image capture device and the memory. The image capture device is used for capturing a video stream in a target area. The memory is used for storing at least one face information. The processor is used for reading the at least one face information in the memory and the video stream from the image capture device. The processor is used for identifying a face matching the at least one face information in the video stream to track the movement of the face in the target area. The processor is further used for determining whether a distance between the face and the image capture device is greater than a predetermined distance. The processor is used for tracking the movement of a human figure corresponding to the face in the target area when the processor determines that the distance is greater than the predetermined distance.

Another embodiment of the present disclosure relates to a tracking method. The tracking method at least includes the following steps: capturing a video stream in a target area; reading at least one face information and the video stream; identifying a face matching the at least one face information in the video stream to track the movement of the face in the target area; determining whether a distance between the face and the image capture device is greater than a predetermined distance; and tracking the movement of a human figure corresponding to the face in the target area when the distance is greater than the predetermined distance.

Therefore, according to the above embodiments of the present disclosure, the present disclosure at least provides a tracking system and a tracking method which are capable of effectively switching recognition and tracking programs of the face and the human figure so as to improve the overall system efficiency and reduce the power consumption.

BRIEF DESCRIPTION OF THE DRAWINGS

The content of the present invention can be better understood with reference to embodiments in subsequent paragraphs and the following accompanying drawings.

DETAILED DESCRIPTION

The spirit of the present disclosure will be clearly illustrated below with reference to the accompanying drawings and detailed description, and variations and modifications may be made by those of ordinary skill in the art without departing from the spirit and scope of the present disclosure after attaining an understanding of the embodiments of the present disclosure.

Unless otherwise particularly indicated, the terms, as used herein, generally have the meanings that would be commonly understood by those of ordinary skill in the art. Some terms used to describe the present disclosure are discussed below or elsewhere in this specification to provide additional guidance to those skilled in the art in connection with the description of the present disclosure.

Figure 1:
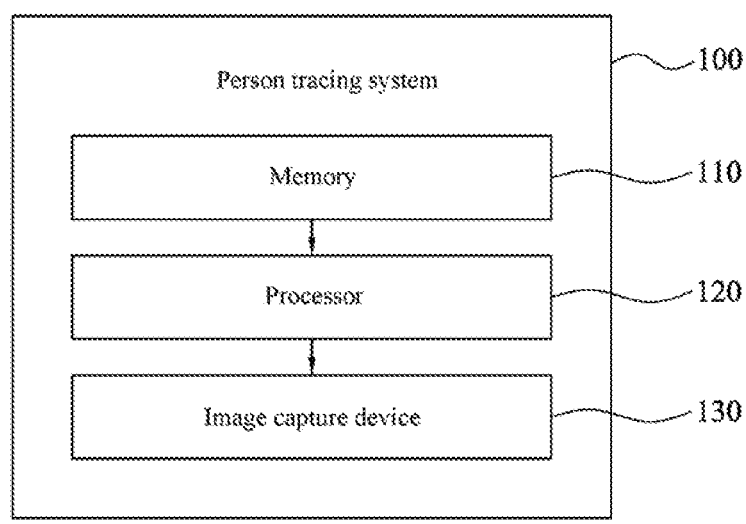
FIG. 1 is a schematic diagram of a tracking system according to some embodiments of the present disclosure.

Referring to FIG. 1, FIG. 1 is a schematic diagram of a tracking system according to some embodiments of the present disclosure. As shown in FIG. 1, in some embodiments, a tracking system 100 includes a memory 110, a processor 120 and an image capture device 130, and the processor 120 is electrically coupled or communicatively coupled to the memory 110 and the image capture device 130.

In some embodiments, the memory 110 and the processor 120 in the tracking system 100 can be together arranged in one position to form a single server, or can be separately arranged in different positions to form a cloud computing system. The memory 110 can be electrically coupled or communicatively coupled to and the processor 120 to perform bidirectional information interchange. Furthermore, in some embodiments, regardless of the single server or the cloud computing system, the processor 120 is electrically coupled or communicatively coupled to the image capture device 130, so that the processor 120 can read the video stream captured by the image capture device 130 to realize functions of the tracking system 100.

It should be understood that the "electrically coupled" or "communicatively coupled" in the present disclosure may be physical coupled or non-physical coupled. For example, in some embodiments, the processor 120 can be coupled to the memory 110 by means of a wireless communication technology, so that the processor 120 and the memory 110 can perform bidirectional information interchange. In some embodiments, the memory 110 and the processor 120 can be coupled by a wire, so that the memory 110 and the processor 120 also can perform bidirectional information interchange. The above embodiments may be referred to as "electrically coupled" or "communicatively coupled".

In some embodiments, the memory 110 may be one or a combination of, but not limited to, a flash memory, a hard disk (HDD), a solid state disk (SSD), a dynamic random access memory (DRAM), and a static random access memory (SRAM). In some embodiments, as a non-transitory computer readable medium, the memory 110 can further store at least one computer readable instruction, the at least one computer readable instruction can be accessed for the processor 120, and the processor 120 can execute the at least one computer readable instruction to run an application program so as to realize the functions of the tracking system 100.

In some embodiments, the processor 120 may include, but not limited to, a single processor or an integration of a plurality of microprocessors, such as a central processing unit (CPU), a graphics processing unit (GPU), or an application specific integrated circuit (ASIC). Based on the above, in some embodiments, the processor 120 can be used for accessing and executing the at least one computer readable instruction from the memory 110 to run the application program so as to realize the functions of the tracking system 100.

In some embodiments, the image capture device 130 may include, but is not limited to, a general-purpose optical camera, an infrared camera, a depth camera, or an adjustable camera. In some embodiments, the image capture device 130 is a stand-alone device, and can capture and store the video stream independently. In some embodiments, the image capture device 130 can capture the video stream and store the video stream in the memory 110. In some embodiments, the image capture device 130 can capture the video stream, the processor 120 can process the video stream and then stored in the memory 110.

In order to better understand the present disclosure, the contents of the application program run by the processor 120 are explained in detail in the following paragraphs.

Figure 2A:
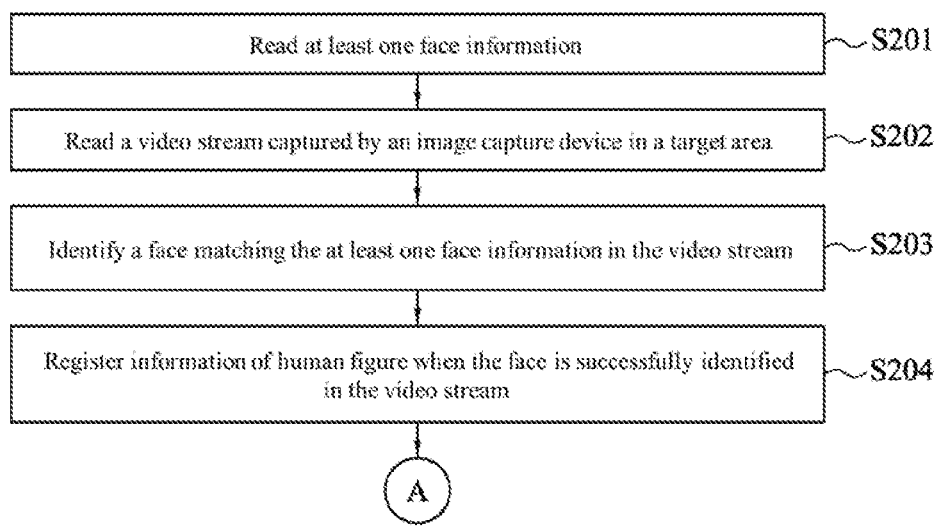
FIG. 2A is a partial flow diagram of a tracking method according to some embodiments of the present disclosure.
Figure 2B:
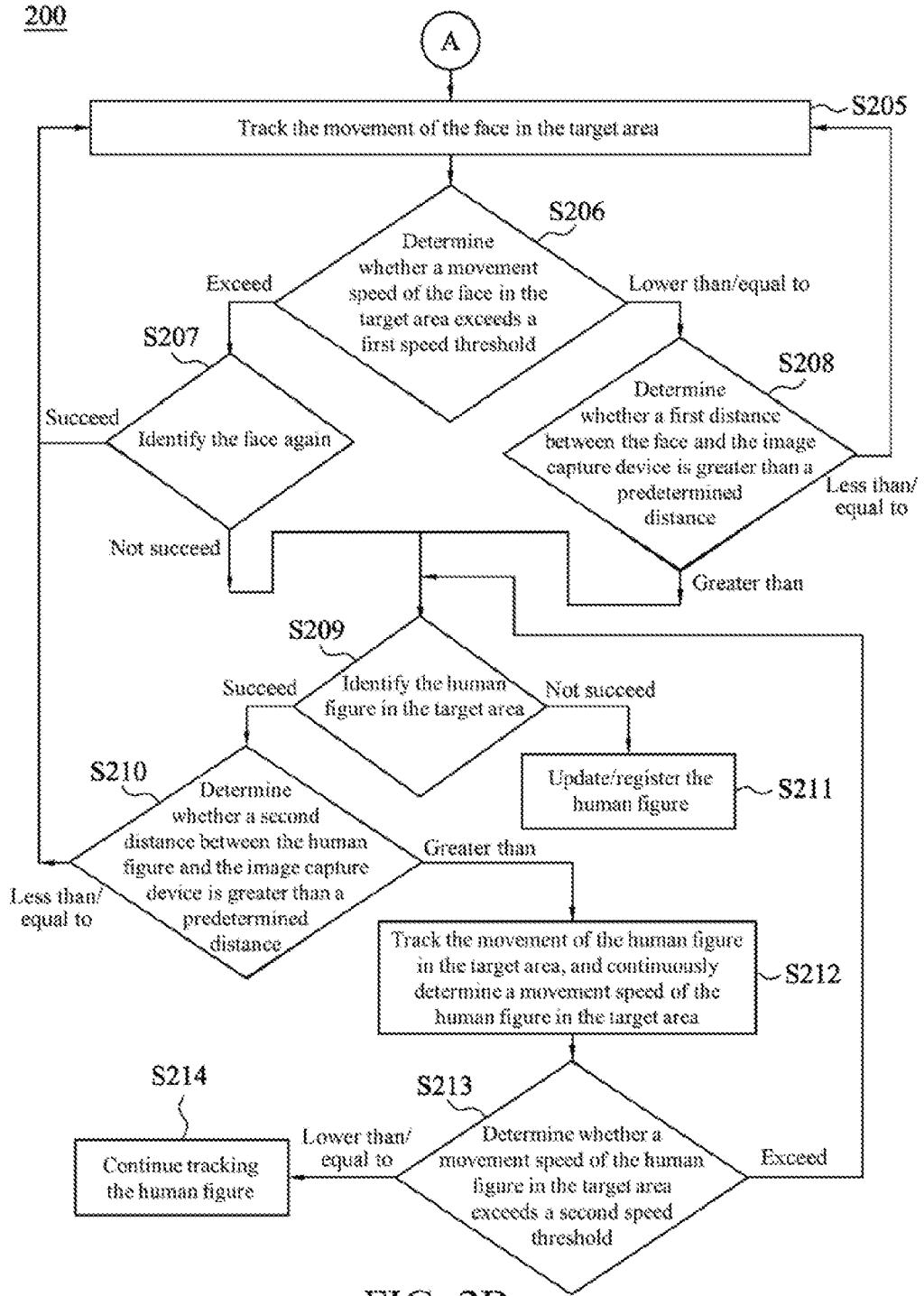
FIG. 2B is a partial flow diagram of a tracking method according to some embodiments of the present disclosure.

Referring to FIG. 2A and FIG. 2B, FIG. 2A and FIG. 2B are respectively a partial flow diagram of a tracking method according to some embodiments of the present disclosure, and together form a complete flow diagram of the tracking method according to some embodiments of the present disclosure. As shown in FIG. 2A and FIG. 2B, in some embodiments, the tracking method 200 can be implemented by the processor 120 in the embodiment of FIG. 1. In order to better understand the following embodiments, please refer to the embodiment of FIG. 1 together to understand the operation of each unit in the tracking system 100.

In detail, the tracking method 200 as shown in FIG. 2A and FIG. 2B is the application program described in the embodiment of FIG. 1, and the processor 120 reads the at least one computer readable instruction from the memory 110 and executes the at least one computer readable instruction to run the application program. In some embodiments, the detailed steps of the tracking method 200 are as follows.

Firstly, referring to FIG. 2A:

S201: reading at least one face information.

In some embodiments, the memory 110 of the tracking system 100 can store at least one face information. In some embodiments, the at least one face information is pre-stored in the memory 110. In some embodiments, the at least one face information is gradually acquired by running a face recognition program by the processor 120 and then stored in the memory 110.

In some embodiments, because the processor 120 is electrically coupled or communicatively coupled to the memory 110, the processor 120 can read the at least one face information from the memory 110. In some embodiments, the at least one face information records static features or dynamic features of a plurality of different faces, such as face shape, lip shape, eye shape, pupil color, eyebrow shape, nose shape, width between eyes and width between mouth and nose, but is not limited thereto.

S202: reading a video stream captured by an image capture device in a target area.

In some embodiments, the image capture device 130 of the tracking system 100 is arranged towards a target area so as to continuously capture the video stream in the target area, in which the video stream may include a plurality of image frames. The image frames can be understood as a plurality of pictures captured by the image capture device 130 from the target area according to a specific time interval.

In some embodiments, the image capture device 130 can store the video stream in the memory 110, and because the processor 120 is electrically coupled or communicatively coupled to the memory 110, the processor 120 can read the video stream from the memory 110. In some embodiments, the image capture device 130 can store the video stream in other memories (such as a memory of the image capture device 130), and the processor 120 can be electrically coupled or communicatively coupled to the memories so as to read the video stream from the memories.

S203: identify a face matching the at least one face information in the video stream.

In some embodiments, the processor 120 can run a face recognition program according to the at least one face information. Thereby, the processor 120 can try to find a face corresponding to the at least one face information in the video stream.

Based on the above, each face in the at least one face information can be defined by means of one or more of the above static features or dynamic features. By identifying the static features or dynamic features in the video stream, the processor 120 can try to identify whether the face appearing in the target area matches the at least one face information, which is a template-based recognition algorithm. However, it should be understood that the recognition algorithm of the present disclosure is not limited thereto.

S204: when the face is successfully identified in the video stream, registering the information of a human figure, in which the human figure is defined by the face and at least one appearance feature corresponding to the face.

In some embodiments, when the processor 120 determines that the similarity between the face appearing in the video stream and a face in the at least one face information exceeds a similarity threshold (such as 80%), the processor 120 determines that the face appearing in the video stream matches the face in the at least one face information. Therefore, the processor 120 can determine that the face in the at least one face information appears in the target area. However, it should be understood that the manner in determining whether the face is matched by the processor 120 of the present disclosure is not limited thereto.

In some embodiments, after the processor 120 successfully identifies the face in the at least one face information in the video stream, the processor 120 can register a human figure corresponding to the face. In some embodiments, the processor 120 can store the information of the human figure in the memory 110.

In some embodiments, the human figure is defined by the face and at least one appearance feature corresponding to the face. The appearance feature can include at least one or a combination of two of clothing, make-up, hair style and body shape, but is not limited thereto. In other words, because the face should belong to a person, after the processor 120 successfully identifies the face, the processor 120 can further use other features (especially physical features) of the person to register the human figure, and the human figure includes other features besides the face (such as clothing, body shape or clothes material). That is, the human figure and the face together define the person.

Referring to FIG. 2B, step S205 follows step S204 of FIG. 2A.

S205: tracking the movement of the face in the target area.

In some embodiments, because the processor 120 successfully identifies the face matching the at least one face information in the video stream, the processor 120 can execute a face tracking program to continuously track the movement of the face. That is, since the processor 120 successfully detects the face from an image frame in the video stream, the processor 120 can execute the face tracking program to continuously determine the position of the face in continuous image frames, thereby continuously tracking the movement of the face in the target area.

In some embodiments, the processor 120 can find a plurality of pixels corresponding to the face in at least two continuous image frames in the video stream. In the at least two continuous image frames, the pixels corresponding to the face may generate a displacement, and the processor 120 can determine a direction variable and a distance variable of movement of the face according to the displacement.

In some embodiments, the direction variable refers to the movement of the pixels corresponding to the face relative to the upper, lower, left and right sides of the entire image frame between the at least two continuous image frames, but the present disclosure is not limited thereto. In some embodiments, the distance variable refers to the number of pixels corresponding the face moving relative to the entire image frame between the at least two continuous image frames, but the present disclosure is not limited thereto.

S206: determining whether a movement speed of the face in the target area exceeds a first speed threshold. When the movement speed is determined to exceed the first speed threshold, executing step S207; and when the movement speed is determined to be lower than or equal to the first speed threshold, executing step S208.

In some embodiments, the processor 120 can track the direction variable and the distance variable corresponding to the movement of the face, and calculate the movement speed of the face according to the direction variable and the distance variable. In some embodiments, the processor 120 can further determine whether the movement speed exceeds a first speed threshold, in which the first speed threshold can be predetermined by a user of the tracking system 100 according to requirements. It should be understood that in some embodiments, the value of the first speed threshold is set to determine whether the movement speed of the face in each image frame is appropriate. An inappropriate movement speed may cause tracking failure in continuous image frames. Therefore, the value of the first speed threshold depends on the tracking accuracy of the processor 120 in determining the face in the target area.

In some embodiments, when the processor 120 determines that the movement speed of the face exceeds the first speed threshold, the movement speed of the face is relatively fast, which may reduce the tracking success rate of the face. In some embodiments, when the processor 120 determines that the movement speed of the face does not exceed (is less than or equal to) the first speed threshold, the movement speed of the face is relatively slow, so that the tracking accuracy of the face can be maintained.

It should be noted that in some embodiments, in response to the relative position of the face in the target area, the first speed threshold of the processor 120 for determining the movement speed may be different. In some embodiments, if the face is located at a relatively central position in the target area, the processor 120 can determine the movement speed according to a relatively high first speed threshold. In some embodiments, if the face is located at a relatively marginal position in the target area, the processor 120 can determine the movement speed according to a relatively low first speed threshold.

Figure 3:
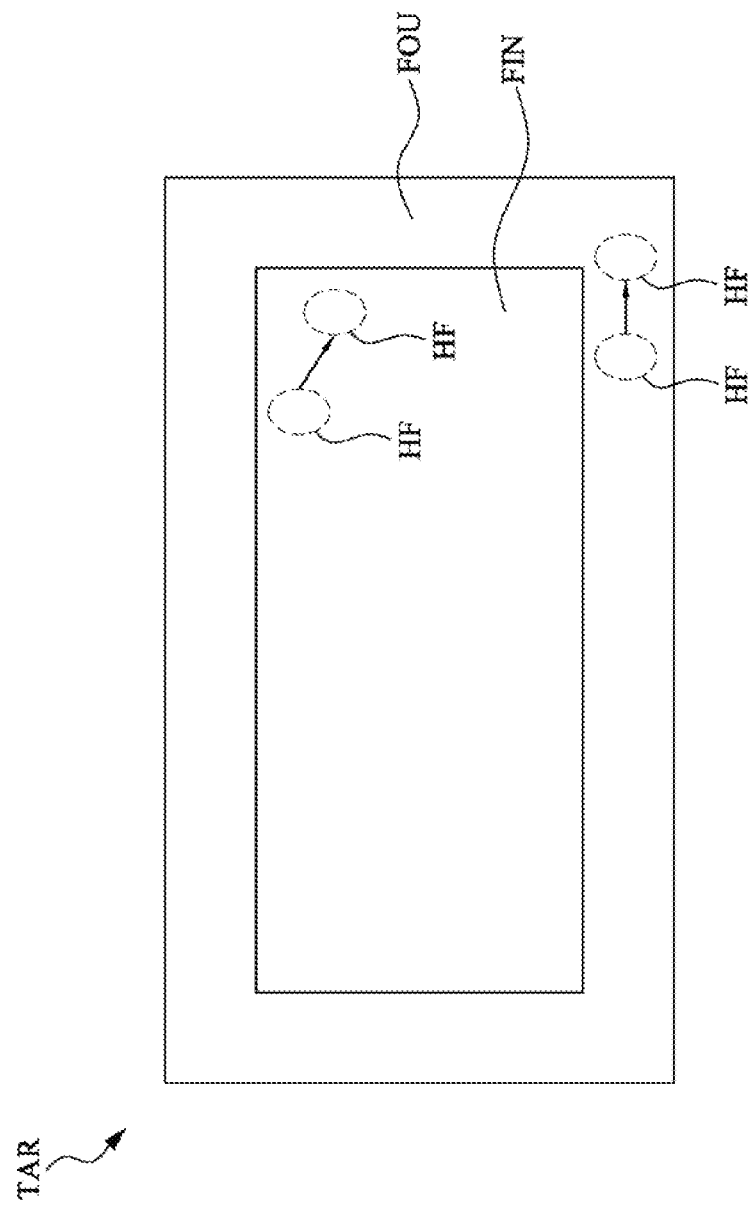
FIG. 3 is a situation schematic diagram of a tracking system according to some embodiments of the present disclosure.

For better understanding, referring to FIG. 3 of the present disclosure, FIG. 3 is a situation schematic diagram of a tracking system according to some embodiments of the present disclosure. As shown in FIG. 3, in some embodiments, the video stream captured by the image capture device 130 at least includes one image frame, and the image frame corresponds to a target area TAR pointed by the image capture device 130. In some embodiments, the width of the image frame corresponds to 7.5 m in the target area TAR, and the height of the image frame corresponds to 4.2 m in the target area TAR.

As shown in the image frame in FIG. 3, in some embodiments, the target area TAR has a relatively inner region FIN and a relatively outer region FOU, and the region FOU surrounds the region FIN. It should be understood that when the processor 120 processes each frame of the video stream, the processor 120 can divide the target area TAR into the central region FIN and the marginal region FOU roughly according to the image frame of FIG. 3. However, it should be understood that the method of distinguishing the target area in the present disclosure is not limited thereto.

In some embodiments, if the processor 120 detects that a face HF is located in the region FIN, the first speed threshold may be set as 10 m/s. In some embodiments, if the processor 120 detects that a face HF is located in the region FOU, the first speed threshold may be set as 1 m/s. That is, when the face HF is located in the relatively marginal region (region FOU) in the target area TAR, because the first speed threshold is relatively low, the processor 120 determines that the probability that the movement speed of the face HF exceeds the first speed threshold is relatively high. On the contrary, when the face is located in the relatively central region (region FIN) in the target area TAR, the processor 120 determines that the probability that the movement speed of the face HF exceeds the first speed threshold is relatively low.

It should be understood that in the above embodiments, the processor 120 sets different first speed thresholds corresponding to different positions of the face HF in the target area TAR, that is because when the face HF is located in the relatively central position in the target area TAR, the probability that the face HF exceeds the target area TAR within a short time is relatively low. On the contrary, when the face HF is located in the relatively marginal position in the target area TAR, the probability that the face HF exceeds the target area TAR within a short time is relatively high, such that face detection should be performed again with more sensitive standards. However, it should be understood that the above embodiments are merely examples, and the setting mode of the first speed threshold in the present disclosure is not limited thereto.

S207: identifying the face again. When the face is successfully identified, step S205 is executed; and on the contrary, when the face is not successfully identified, step S209 is executed.

In some embodiments, when the processor 120 determines that the movement speed of the face exceeds the first speed threshold, the movement speed of the face is relatively fast, which will reduce the tracking success rate. In this case, the processor 120 executes the face recognition program again in the continuous image frames (step S207) so as to try to identify the face again.

In some embodiments, when the processor 120 successfully identifies the face again in the continuous image frames, the processor 120 executes the face tracking program again so as to continue tracking the movement of the face (step S205).

S208: determining whether a first distance between the face and the image capture device is greater than a predetermined distance. When the first distance is determined to be greater than the predetermined distance, step S209 is executed; and when the first distance is determined to be less than or equal to the predetermined distance, step S205 is executed.

In some embodiments, when the processor 120 determines that the movement speed of the face is less than or equal to the first speed threshold, the movement speed of the face is suitable for tracking. In this case, the processor 120 further determines whether the distance between the face and the image capture device 130 is greater than a predetermined distance. In some embodiments, the image capture device 130 may be a depth camera, so that the image frames captured by the image capture device 130 include the depth information of a scene in the target area, and the processor 120 can determine the distance between the face and the image capture device 130 according to the depth information corresponding to the face.

In some embodiments, the predetermined distance can be set by a user of the tracking system 100 according to requirements. It should be understood that in some embodiments, the value of the predetermined distance depends on the recognition accuracy of the face. For example, if the distance between the face and the image capture device 130 exceeds 15 m, the features on the face may be blurred, thereby reducing the recognition accuracy of the face. Under this consideration, the predetermined distance can be set to be 15 m. However, it should be understood that the above value is for an illustrative purpose only, and the present disclosure is not limited thereto.

S209: identifying the human figure in the target area. When the human figure is successfully identified, step S210 is executed; and on the contrary, when the human figure is not successfully identified, step S211 is executed.

In some embodiments, following step S207, when the processor 120 does not successfully identify the face in the continuous image frames, the processor 120 executes a human figure recognition program (step S209) so as to identify the human figure corresponding to the face in the continuous image frames.

In some embodiments, following step S208, when the processor 120 determines that the distance between the face and the image capture device 130 is greater than the predetermined distance, the processor 120 also executes the human figure recognition program (step S209) so as to identify the human figure corresponding to the face in the continuous image frames.

It can also be understood that in these embodiments, the processor 120 identifies the human figure in the target area instead of identifying the face.

Based on the above, in some embodiments, if the processor 120 already registers the human figure previously according to the face, the processor 120 can identify the human figure according to the appearance feature when the human figure is registered. For example, the processor 120 can identify the human figure in the continuous image frames according to appearance features such as clothing, make-up, hair style and body shape of a person.

S210: determining whether a second distance between the human figure and the image capture device is greater than a predetermined distance. When the second distance is determined to be greater than the predetermined distance, step S212 is executed; and on the contrary, when the second distance is determined to be less than or equal to the predetermined distance, step S205 is executed.

In some embodiments, following step S209, if the processor 120 registers the human figure previously according to the face and the processor 120 successfully identifies the human figure in the continuous image frames, the processor 120 further determines whether the distance between the human figure and the image capture device 130 is greater than a predetermined distance. It should be understood that in some embodiments, the predetermined distance can be set by the user of the tracking system 100 according to requirements and can be equal to the predetermined distance in the above embodiments. However, the present disclosure is not limited thereto.

In some embodiments, following step S210, when the processor 120 determines that the distance between the human figure and the image capture device 130 is less than or equal to the predetermined distance, the processor 120 can execute the face tracking program again to continue tracking the face in the continuous image frames, which is the same as the operation of step S205.

S211: updating/registering the human figure.

In some embodiments, following step S209, when the processor 120 does not successfully identify the human figure in the continuous image frames, the human figure may not be registered. In this case, the processor 120 can register the human figure according to the current appearance feature. In some embodiments, the processor 120 can store the human figure in the memory 110.

In some embodiments, following step S209, when the processor 120 does not successfully identify the human figure in the continuous image frames, it may represent that the appearance feature of the human figure is already changed. In some embodiments, if the processor 120 determines that the human figure is registered but the registration time exceeds a predetermined time, the processor 120 can modify the appearance feature corresponding to the human figure according to the current appearance feature, thereby updating the information related to the human figure in the memory 110. In some embodiments, in consideration of a situation that a person entering the target area may replace different clothes or dresses every day, the predetermined time may be set to one day.

S212: tracking the movement of the human figure in the target area, and continuously determining a movement speed of the human figure in the target area.

In some embodiments, following step S210, when the processor 120 determines that the distance between the human figure and the image capture device 130 is greater than the predetermined distance, the processor 120 can execute a human figure tracking program to track the human figure in the continuous image frames, that is, the processor 120 can track the movement of the human figure in the target area.

S213: determining whether a movement speed of the human figure in the target area exceeds a second speed threshold. When the movement speed is determined to exceed the second speed threshold, step S209 is executed; and on the contrary, when the movement speed is determined to be less than or equal to the second speed threshold, step S214 is executed.

In some embodiments, even if the processor 120 tracks the movement of the human figure in the target area, the processor 120 continuously determines the movement speed of the human figure in the target area and determines whether the movement speed exceeds a second speed threshold. It should be understood that the setting of the second speed threshold is similar to that of the first speed threshold in order to determine whether the movement speed of the human figure in each image frame is appropriate or not, thereby avoiding tracking failure.

In some embodiments, the value of the second speed threshold can be set the same as that of the first speed threshold. In some embodiments, the value of the second speed threshold is different from that of the first speed threshold. The value of the second speed threshold depends on the tracking accuracy of the human figure in the target area determined by the processor 120. In some embodiments, because the human figure may be located at a relatively far position in the target area, the value of the second speed threshold is less than that of the first speed threshold.

In some embodiments, when the processor 120 determines that the movement speed of the human figure in the target area exceeds the second speed threshold, the processor 120 can execute step S209 so as to execute the human figure recognition program again.

S214: continuing tracking the human figure.

In some embodiments, when the processor 120 determines that the movement speed of the human figure in the target area is less than or equal to the second speed threshold, the processor 120 continues executing the human figure tracking program so as to track the human figure.

In the above embodiments, the tracking system 100 of the present disclosure (as shown in FIG. 1) is provided with a plurality of functional blocks or modules. It should be understood by those skilled in the art that in some embodiments, preferably, the functional blocks or modules can be implemented by a circuit (exclusive circuit or universal circuit operated by one or more processors and coded instructions). In general, the circuit can include transistors or other circuit components and is configured in the mode of the above embodiments, so that the circuit can be operated according to the functions and operations of the present disclosure. Further, cooperative programs between the functional blocks or modules in the circuit can be implemented by a specific compiler, such as a register transfer language (RTL) compiler. However, the present disclosure is not limited thereto.

It should be noted that the above embodiments are merely examples to facilitate the description of the technical features of the present disclosure and are not intended to limit the implementation modes of the present disclosure. It should be understood by those skilled in the art that the technology of the present disclosure can be implemented into various feasible situations through the description of the context of the present disclosure. For example, in the above embodiments, only a single target recognition situation is taken as an example. It should be understood by those skilled in the art that the tracking system and the tracking method of the present disclosure can be similarly implemented in a multi-target recognition situation for simultaneously identifying and tracking a plurality of faces in the at least one face information.

As can be seen from the above implementation modes of the present disclosure, the tracking system, the tracking method and the non-transitory computer readable medium provided by the embodiments of the present disclosure can effectively register the human figure corresponding to the face and switch the recognition and tracking programs of the face and the human figure under specific conditions, so that the amount of calculation of the system can be reduced, the efficiency of the overall system can be improved, and the power consumption of the overall system can be reduced.

Although the present disclosure is described with reference to the above embodiments, the embodiments are not intended to limit the present disclosure. A person of ordinary skill in the art may make variations and modifications without departing from the spirit and scope of the present disclosure. Therefore, the protection scope of the present disclosure should be subject to the appended claims.

What is claimed is:

1. A tracking system, comprising:
   an image capture device, configured to capture a video stream in a target area;
   a memory, configured to store at least one face information; and
   a processor, coupled to the image capture device and the memory and configured to:
   read the at least one face information in the memory;
   read the video stream from the image capture device;
   identify a face matching the at least one face information in the video stream to track a movement of the face in the target area;
   determine whether a distance between the face and the image capture device is greater than a predetermined distance; and
   track the movement of a human figure corresponding to the face in the target area when the distance is greater than the predetermined distance.

2. The tracking system according to claim 1, wherein in response to the face being successfully identified, the processor is configured to store information of the human figure in the memory, and the human figure is defined by the face and an appearance feature corresponding to the face.

3. The tracking system according to claim 2, wherein after a predetermined time, when the processor successfully identifies the face again in the video stream, the processor is configured to update the information of the human figure in the memory.

4. The tracking system according to claim 3, wherein the predetermined time is one day.

5. The tracking system according to claim 2, wherein the appearance feature comprises at least one or a combination of two of clothing, make-up, hair style and body shape.

6. The tracking system according to claim 1, wherein the processor determines the distance between the face and the image capture device according to depth information corresponding to the face in the video stream.

7. The tracking system according to claim 1, wherein the movement of the face is determined by a direction variable and a distance variable of a plurality of pixels corresponding to the face in at least two continuous frames in the video stream, and the processor further calculates a moving speed of the face according to the direction variable and the distance variable of the pixels.

8. The tracking system according to claim 7, wherein the processor is further configured to determine whether the moving speed of the face exceeds a speed threshold, when the processor determines that the moving speed exceeds the speed threshold, the processor identifies the face again;

when the processor succeeds to identify the face, the processor tracks the movement of the face;

when the processor fails to identify the face, the processor tracks the movement of the human figure; and when the processor determines that the moving speed is lower than or equal to the speed threshold, the processor determines whether the distance is greater than the predetermined distance.

9. The tracking system according to claim 8, wherein when the face is located in a central region of the target area, the speed threshold corresponds to a first value, when the face is located in a marginal region of the target area, the speed threshold corresponds to a second value, and the first value is greater than the second value.

10. A tracking method, comprising:
capturing a video stream in a target area;
reading at least one face information and the video stream;
identifying a face matching the at least one face information in the video stream to track a movement of the face in the target area;
determining whether a distance between the face and the image capture device is greater than a predetermined distance; and
tracking the movement of a human figure corresponding to the face in the target area when the distance is greater than the predetermined distance.

11. The tracking method according to claim 10, wherein in response to the face being successfully identified, the tracking method further comprises:
storing information of the human figure in a memory, wherein the human figure is defined by the face and an appearance feature corresponding to the face.

12. The tracking method according to claim 11, wherein the tracking method further comprises:

after a predetermined time, when the processor successfully identifies the face again in the video stream, updating the information of the human figure in the memory.

13. The tracking method according to claim 12, wherein the predetermined time is one day.

14. The tracking method according to claim 11, wherein the appearance feature comprises at least one or a combination of two of clothing, make-up, hair style and body shape.

15. The tracking method according to claim 10, wherein the step of determining whether the distance between the face and the image capture device is greater than the predetermined distance comprises:
determining the distance between the face and the image capture device is greater than the predetermined distance according to depth information corresponding to the face in the video stream.

16. The tracking method according to claim 10, wherein the movement of the face is determined by a direction variable and a distance variable of a plurality of pixels corresponding to the face in at least two continuous frames in the video stream, and the tracking method further comprises:
calculating a moving speed of the face according to the direction variable and the distance variable of the pixels.

17. The tracking method according to claim 16, wherein the tracking method further comprises:
determining whether the moving speed of the face exceeds a speed threshold;
when the moving speed exceeds the speed threshold, identifying the face again;
when the face is successfully identified, tracking the movement of the face;
when the face fails to be identified, tracking the movement of the human figure; and
when the moving speed is determined to be lower than or equal to the speed threshold, determining whether the distance is greater than the predetermined distance.

18. The tracking method according to claim 17, wherein when the face is located in a central region of the target area, the speed threshold corresponds to a first value, when the face is located in a marginal region of the target area, the speed threshold corresponds to a second value, and the first value is greater than the second value.

* * * * *